(12) United States Patent
Gregoris

(10) Patent No.: US 9,115,867 B2
(45) Date of Patent: Aug. 25, 2015

(54) DUAL REFLECTOR SYSTEM FOR LINEAR LAMP ILLUMINATORS

(75) Inventor: Dennis Gregoris, Burlington (CA)

(73) Assignee: MACDONALD, DETTWILER AND ASSOCIATES INC., Brampton, ON (CA)

(*) Notice: Subject to any disclaimer, the term of this patent is extended or adjusted under 35 U.S.C. 154(b) by 748 days.

(21) Appl. No.: 12/907,685

(22) Filed: Oct. 19, 2010

(65) Prior Publication Data

US 2012/0092859 A1 Apr. 19, 2012

(51) Int. Cl.
*F21V 7/06* (2006.01)
*F21V 7/00* (2006.01)
(Continued)

(52) U.S. Cl.
CPC . *F21V 7/06* (2013.01); *F21V 7/005* (2013.01); *F21V 7/0033* (2013.01); *F21V 7/04* (2013.01);
(Continued)

(58) Field of Classification Search
CPC .......... B23K 26/0738; B23K 26/0604; G02B 27/0966; G02B 19/0047; G02B 27/0983; G02B 6/272; G02B 19/0019; G02B 26/126; G02B 27/30; G01J 3/02; G01J 3/0208; G01J 3/0205; B41J 2/473; B41J 2/45; G01N 21/031; F21Y 2101/02; F21Y 2103/003; F21Y 2103/00; F21V 7/06; F21V 7/04; F21V 7/005; F21V 7/0033; F21V 7/22; G03B 15/03; G03B 2215/0582
USPC ............ 362/217.06, 609, 514, 516, 517, 215, 362/217.05, 217.07, 241, 243, 245, 247, 362/296.01, 327, 328, 341, 346; 356/243.1; 250/216; 347/242, 257, 204.1, 241, 347/256, 263; 372/99; 359/204.1, 710, 861
See application file for complete search history.

(56) References Cited

U.S. PATENT DOCUMENTS 2,252,246 A 8/1941 Bergmans et al.
3,254,342 A 5/1966 Miller
(Continued)

FOREIGN PATENT DOCUMENTS

EP 1708513 4/2006

OTHER PUBLICATIONS

International Search Report. PCT/CA2011/050659. Filed Oct. 19, 2011. Completed Jan. 12, 2012.
(Continued)

*Primary Examiner* — Stephen F Husar
*Assistant Examiner* — Danielle Allen
(74) *Attorney, Agent, or Firm* — Lynn C. Schumacher; Hill & Schumacher

(57) ABSTRACT

The present invention provides an illuminator system comprising a dual reflector system and a linear light source. The dual reflector system comprises a primary and secondary generally cylindrical reflector, which collimate light from a linear light source in two planes. The linear light source may comprise many light emitting devices, and may emit light in a strobe or continuous fashion. The reflectors may be of many cylindrical shapes, and may include additional mirror segments to capture light otherwise not collimated. Further, the reflectors may be in various configurations of position and orientation with respect to one another, and may be adjustable in this respect. The system is more efficient than existing illuminators, is compact, all reflective (no color), lightweight, simple and inexpensive to manufacture. The system has applications to many fields including machine vision, surveillance, spectroscopic inspection of materials, and converting linear light sources into rectangular beam spot lights.

24 Claims, 12 Drawing Sheets

(51) Int. Cl.
*F21V 7/04* (2006.01)
*G03B 15/03* (2006.01)
*F21V 7/22* (2006.01)
*F21Y 103/00* (2006.01)

(52) U.S. Cl.
CPC . *G03B 15/03* (2013.01); *F21V 7/22* (2013.01); *F21Y 2103/00* (2013.01); *G03B 2215/0582* (2013.01)

(56) References Cited

U.S. PATENT DOCUMENTS

| | | |
|---|---|---|
| 3,938,162 A | 2/1976 | Schmidt |
| 4,208,661 A | 6/1980 | Vokurka |
| 4,210,954 A | 7/1980 | Laser |
| 4,755,916 A | 7/1988 | Collins |
| 4,947,292 A | 8/1990 | Vlah |
| 5,037,191 A | 8/1991 | Cheng |
| 5,235,470 A | 8/1993 | Cheng |
| 5,618,102 A * | 4/1997 | Ferrell ............ 362/516 |
| 5,897,183 A * | 4/1999 | Dehmlow ............ 349/58 |
| 6,454,442 B1 * | 9/2002 | Changaris ............ 362/297 |
| 6,536,921 B1 | 3/2003 | Simon |
| 6,634,759 B1 * | 10/2003 | Li ............ 359/853 |
| 7,556,399 B1 | 7/2009 | Bailey |
| 2006/0171160 A1 | 8/2006 | Meyrenaud et al. |
| 2006/0227557 A1 * | 10/2006 | Li ............ 362/341 |

OTHER PUBLICATIONS

EPO Search Report dated Oct. 16, 2014, PT03033EP, 11833680.9, PCT/CA2011/050659, 7 pages.

* cited by examiner

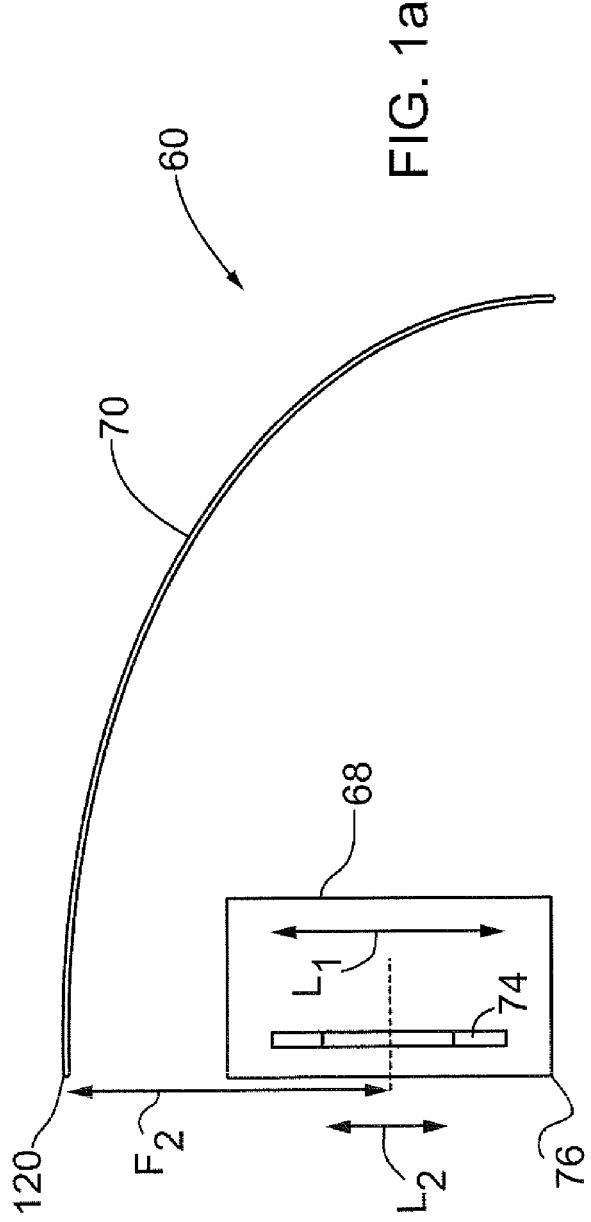
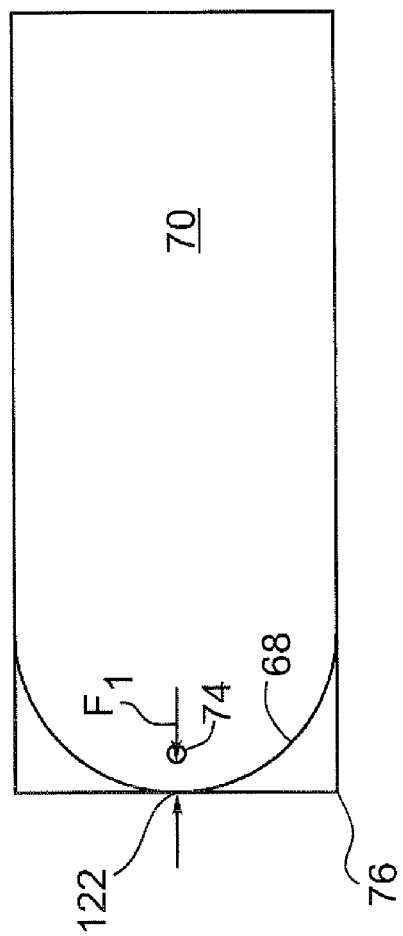

DUAL REFLECTOR SYSTEM FOR LINEAR LAMP ILLUMINATORS

FIELD OF THE INVENTION

This invention generally relates to illuminator systems, and more specifically a linear lamp illuminator system with a dual reflector system.

BACKGROUND OF THE INVENTION

Flashlamps are often used as illumination sources for machine vision or surveillance cameras. However, the flashlamp emits light in all directions, so a collimating optical system must be used to concentrate the light onto the target of interest. Cylindrical parabolic or paraboloid reflectors are often used to collimate the light from linear flashlamps, sometimes in conjunction with a fresnel refractive lens. Unfortunately these standard methods have a number of drawbacks.

Cylindrical reflectors can only collimate the light in one plane and have a very wide beam in a plane orthogonal thereto, so most of the light generated by the lamp is wasted. Adding a cylindrical fresnel lens helps, but the lens must have a long focal length and large aperture which makes it heavy and expensive. Refractive elements can also separate the colours of the light due to dispersion, which is often undesirable in applications involving optical sensors.

Paraboloid reflectors may capture most of the light, but in order to function well the illumination source must fit entirely within the paraboloid. For long flashlamps, this imposes a large diameter for the reflector, making the reflector large and expensive. Examples of this configuration are disclosed in U.S. Pat. Nos. 5,037,191 and 5,235,470, which generally describe paraboloid reflectors for use with a linear light source. Further, some configurations of paraboloid reflectors such as the ones found in U.S. Pat. Nos. 4,210,954 and 3,254,342 may produce a doughnut beam pattern which is often undesirable for imaging applications.

U.S. Pat. No. 3,938,162 describes an antenna system for single or plural beams providing continuously variable beamwidth selectively in one or both of two orthogonal senses. The system includes two parabolic cylindrical reflectors, which are positioned with the focal axes thereof orthogonally. A point of multibeam feed is mounted adjacent the main reflector on the focal axis of the sub-reflector in the Airy disc of the system. Simultaneous operation of telescoping sections of the two reflectors provides bidirectional zooming of the beam.

U.S. Pat. No. 4,208,661 describes an antenna system with two parabolic cylindrical reflectors with a point feed source located on the focal axis of one of the reflectors, wherein the directrix of the cylindrical wave front obtained by exposure of the first reflector coincides with the focal line of the second reflector, and the focal line of the first reflector is not parallel to the symmetry plane of the second reflector.

Therefore, it would be very advantageous to provide an improved reflector system for linear lamp illuminators.

SUMMARY OF THE INVENTION

In general, embodiments of the present invention comprise an illuminator system comprising:
a dual reflector system comprising
a primary generally cylindrical reflector having a primary focal axis and oriented to collimate light in a first plane, and
a secondary generally cylindrical reflector having a secondary focal axis and oriented to collimate light in a second plane; and
a linear light source having an emission length disposed on the primary focal axis; wherein
said primary generally cylindrical reflector and said secondary generally cylindrical reflector are oriented relative to each other such that at least a portion of the light emitted by the linear light source is reflected and becomes collimated in both said first plane and said second plane.

In some embodiments of the invention, the primary and secondary generally cylindrical reflectors may be parabolic. In addition, in some embodiments, the secondary focal axis may lie at a distance from the primary vertex, and in some cases may be at a distance equal to the primary focal length from the primary vertex.

The generally cylindrical reflectors of the present invention may have vertices which are curved or linear.

In some embodiments of the invention, the secondary focal length will be greater than or equal to half of the emission length of the linear light source. Many light sources are applicable for use in the present invention. Some exemplary useful light sources are flash lamps, continuous wave cylindrical linear light sources, tungsten halogen lamps, sodium lamps, metal halide lamps, and fluorescent lamps. In addition, the light sources may operate as a strobe light.

Some embodiments of the invention will include additional mirror segments located parallel to the primary generally cylindrical reflector and oriented with respect to said primary generally cylindrical reflector to reflect stray light back through said primary focal axis. Further, these mirror segments may be positioned such that light passing through said primary focal axis and reflecting from said primary generally cylindrical reflector does not reflect from said at least one mirror segment.

The dual reflector system of the present invention may include reflectors which are milled reflective material, and may include reflectors which are flexible reflective sheets mounted to inserts. Further, the reflectors may be mounted to a single base, and may be in the form of a parabola.

In some embodiments of the invention, the first and second planes in which the emitted light is collimated are mutually orthogonal.

Further, the position and orientation of the primary and secondary generally cylindrical reflectors with respect to one another may be adjustable. In some of these embodiments, the primary generally cylindrical reflector is able to translate and rotate relative to said secondary generally cylindrical reflector in a plane perpendicular to said secondary focal axis.

The primary focal axis, in some embodiments, may lie between a plane defined by two straight edges on the primary generally cylindrical reflector and the reflector itself.

Finally, some embodiments of the invention will include a primary generally cylindrical reflector comprising a parabolic portion and a portion which wraps around the light source. The portion which wraps around the linear light source may be circular in shape, and the linear light source may be disposed at the centre of the circle.

A further understanding of the functional and advantageous aspects of the invention can be realized by reference to the following detailed description and drawings.

BRIEF DESCRIPTION OF THE DRAWINGS

Embodiments of the invention will be more fully understood from the following detailed description thereof taken in connection with the accompanying drawings, which form a part of this application, and in which:

FIG. 1a is a top view of a dual reflector system absent support structures for linear lamp illuminators constructed in accordance with the present invention;

FIG. 1b is a side view of the dual reflector system of FIG. 1a;

FIG. 8b is a front view of the alternative embodiment of FIG. 8a.

DETAILED DESCRIPTION OF THE INVENTION

Figure 2:
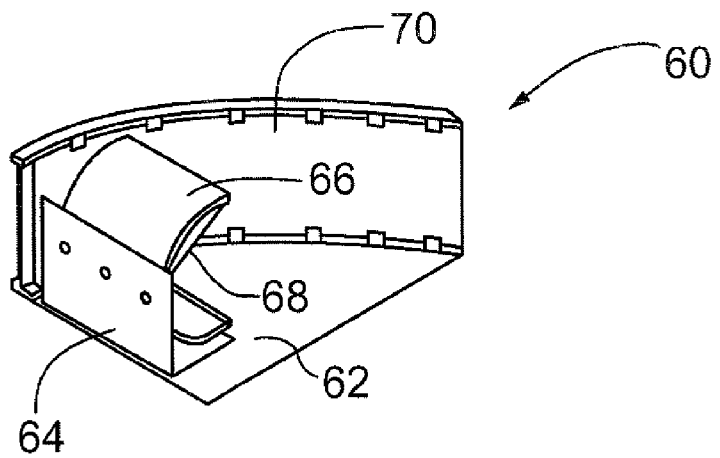
FIG. 2 is a perspective view of the focusing optics of the dual reflector system of FIGS. 1a and 1b.

Generally speaking, the systems described herein are directed to a dual reflector system for linear lamp illuminators. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to dual reflector system for linear lamp illuminators.

FIGS. 1a and 1b show respectively a top and side view sketch of the dual reflector system 60, absent supporting structures, to illustrate the basic concept. The dual reflector system includes a primary generally cylindrical mirror or reflector 68 with a linear illumination source, e.g. a cylindrical flash lamp 74 aligned along the length of the focal axis (at 74 in FIG. 1b) of mirror 68. A secondary generally cylindrical mirror or reflector 70 is oriented relative to the primary mirror 68 such that light emitted from the linear light source is reflected from the primary and secondary mirrors 68, 70 and is thereby collimated in two planes, forming a collimated beam. In some embodiments of the invention in which the reflectors 68, 70 are generally cylindrical parabolic, the primary and secondary reflectors 68, 70 have primary and secondary focal axes and primary and secondary vertices 122, 120, respectively. Further, the distance between each focal axis and its respective vertex is called the focal length. In some embodiments, the secondary focal axis of the secondary mirror 70 ($F_2$) preferably falls on or behind the vertex 122 of the primary mirror 68. In the embodiment of the invention shown in FIGS. 1a and 1b, the focal axis of the secondary mirror 70 falls on the vertex 122 of the primary mirror 68. Linear light source 74 has an overall length L1 and an emission length L2.

FIG. 2 shows a perspective view of one embodiment of the invention including supporting structure and the assembled dual reflector system 60 focusing optics for producing the optical beam. In this embodiment, the primary parabolic mirror/reflector 68 is mounted to a cylindrical mounting bracket 66 which in turn is mounted to a mounting bracket 64. Mounting bracket 64 is mounted on a base 62. The mounting bracket 66 may include inserts between the bracket and the mirror 68 that form the mirror 68 in the shape of a parabola. The secondary parabolic reflector/mirror 70 is mounted to a mirror mount 72 which in turn is mounted to base 62.

Figure 14:
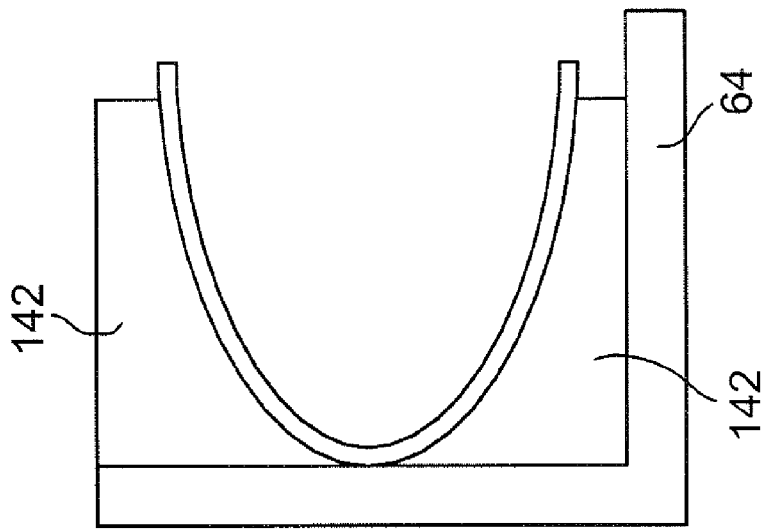
FIG. 14 is a side view of an embodiment of the invention in which the primary generally cylindrical reflector comprises a flexible sheet of reflective material affixed to a support bracket.

FIG. 14 shows a side view of one embodiment of the invention in which the primary generally cylindrical reflector 68 comprises a flexible sheet of reflective material. This sheet may be mounted to a base or other structure with inserts with the desired form. In the shown embodiment, the reflector 68 is formed in the shape of a parabola by the inserts 142 mounted to a mounting bracket 64. In another embodiment of the invention, the primary generally cylindrical reflector 68 is milled from reflective material and does not require supporting structure to maintain its shape. One skilled in the art would appreciate that the secondary generally cylindrical reflector 70 may also be built in the described fashions.

Figure 3:
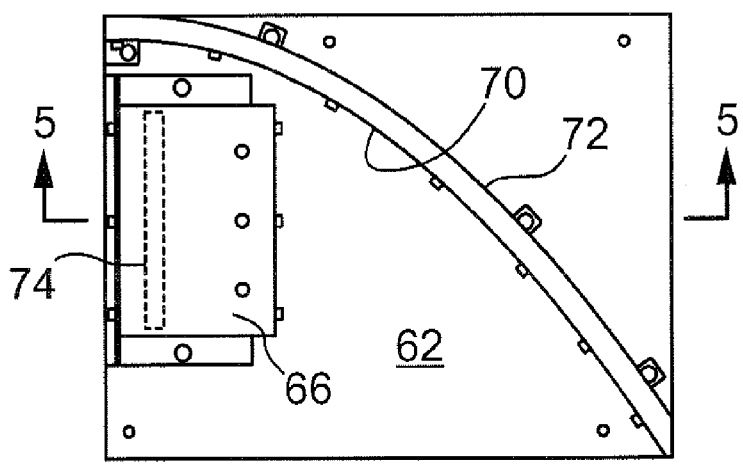
FIG. 3 is a top view of the focusing optics of the dual reflector of FIGS. 1a and 1b.
Figure 4:
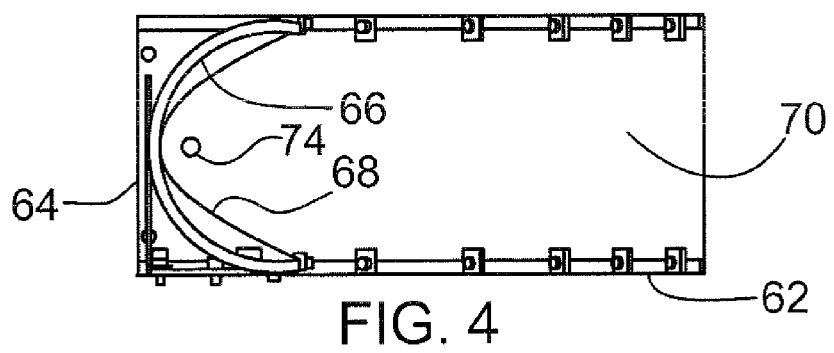
FIG. 4 is a side view of the focusing optics of the dual reflector of FIGS. 1a, 1b.
Figure 5:
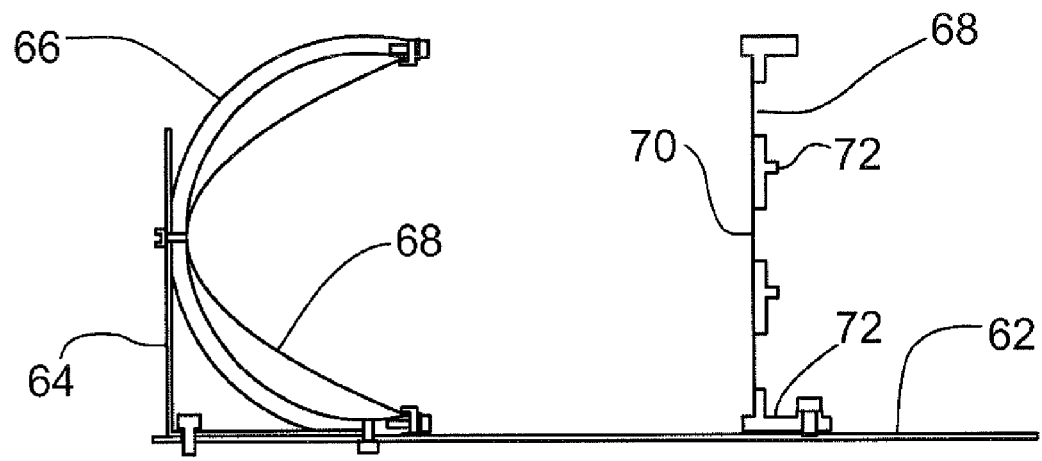
FIG. 5 is a section along the line 5-5 of FIG. 3.
Figure 6:
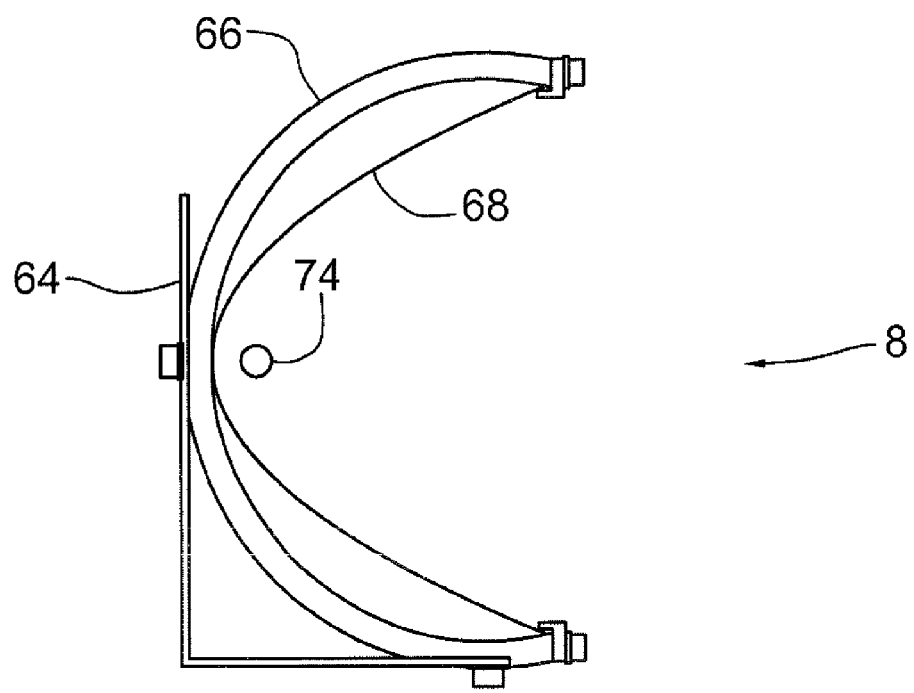
FIG. 6 is a side view showing the primary reflector and reflector mount and mounting bracket of FIG. 7.
Figure 7:
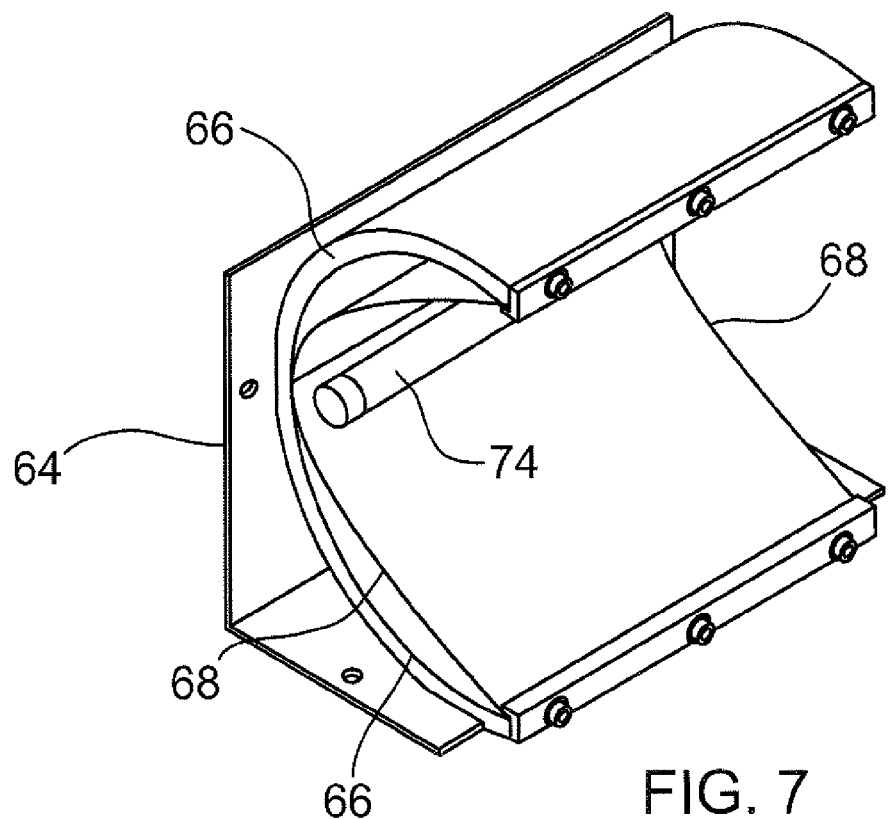
FIG. 7 is a perspective view showing the primary reflector and reflector mount and mounting bracket.
Figure 8:
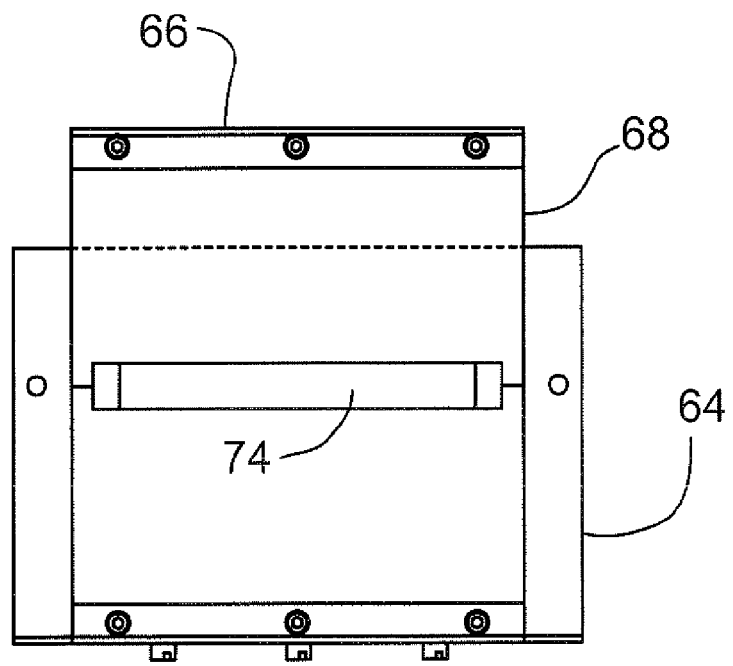
FIG. 8 is a view taken along arrow 8 of FIG. 6.

FIG. 3 is a top view of the focusing optics of the dual reflector of FIGS. 1a, 1b. FIG. 4 is a side view of the focusing optics of the dual reflector of FIGS. 1a, 1b. FIG. 5 is a section along the line 5-5 of FIG. 3. FIG. 7 is a perspective view showing the primary reflector 68, reflector mount 66 and mounting bracket 64. FIG. 6 is a side view showing the primary reflector 68, reflector mount 66, and mounting bracket 64 of FIG. 7. FIG. 8 is a view taken along arrow 8 of FIG. 6.

The two generally cylindrical reflectors 68 and 70 are used to collimate the light from the linear light source 74 into a narrow beam that, for instance, may match the field-of-view of a camera. The primary reflector 68 collimates the light in a first plane and the secondary reflector 70 collimates the light in a second plane. In preferable embodiments of the invention, the second plane is orthogonal to the first plane. In another preferable embodiment of the invention, the primary and secondary reflectors 68, 70 are oriented such that as much as possible of the light which is not reflected by the first and second reflectors 68, 70 is preferably already collimated in the desired direction upon emission from the linear lamp 74.

Referring again to FIGS. 1*a* and 1*b*, the focal length $F_2$ of the secondary mirror 70 is preferably equal to, or greater than, half the linear light source emission length $L_2$. Typically the focal length $F_2$ of secondary mirror 70 is made large enough so the secondary mirror 70 location accommodates the physical length $L_1$ of the linear light source 74 i.e. it is equal to or greater than half the physical length $L_1$ of the linear light source 74.

The focal lengths $(F_1)$ of the primary mirror 68 and the secondary mirror 70 $(F_2)$ respectively are selected to achieve the desired illumination beam widths in the vertical and horizontal directions respectively given the diameter of the arc and the length of the arc.

Figure 8A:
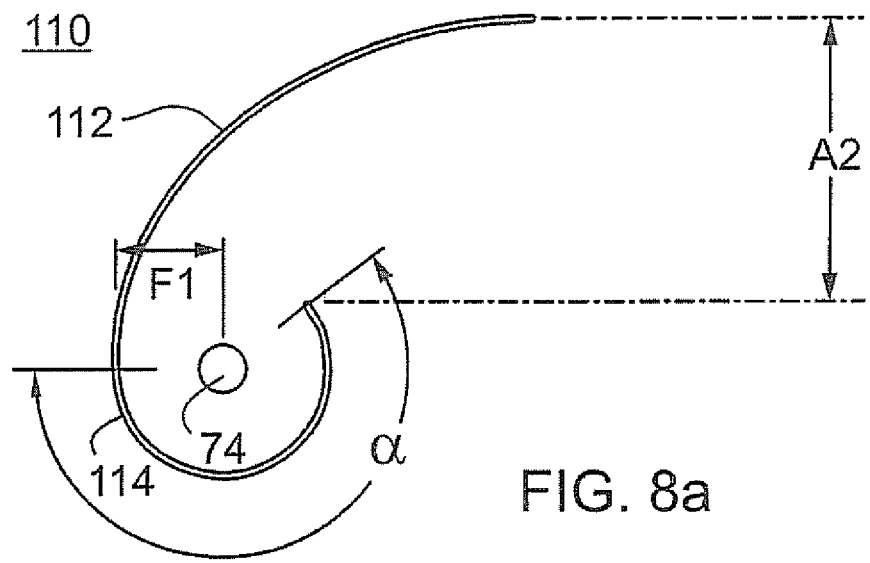
FIG. 8a is a side view of an alternative embodiment of a primary reflector of the dual reflector system including a portion of the reflector that wraps around the linear illumination source to capture more emitted light.
Figure 8B:
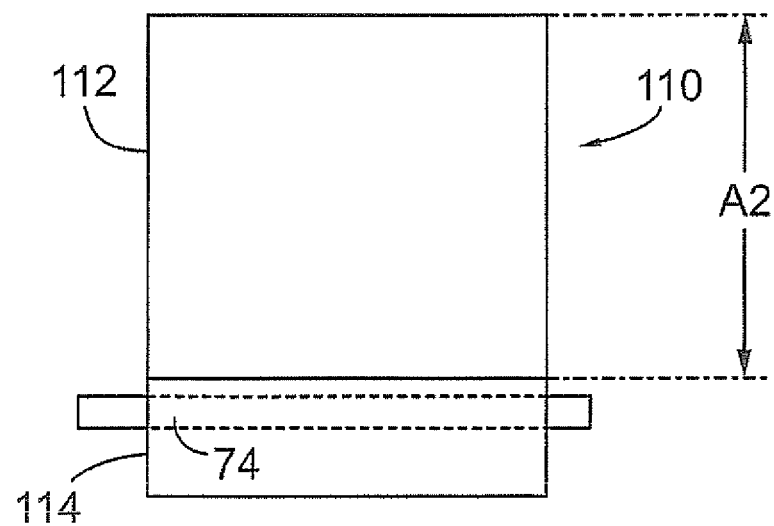

While a preferable shape of the generally cylindrical primary reflector 68 is parabolic as shown in FIG. 1*a*, other shapes may provide some advantageous features. As an example, the embodiment of a primary reflector 110 shown in FIGS. 8*a* and 8*b* is a primary reflector of the dual reflector system 60 wherein a portion 112 of the reflector is parabolic to collimate light, and another cylindrical portion 114 wraps around the linear illumination source 74 to capture more emitted light. The cylindrical mirror 110 also has the effect of altering the intensity of the output beam light distribution in the vertical plane such that the intensity increases nearer the source throughout the aperture A2. The shape of the vertical intensity profile of the output beam is adjusted by the cylindrical mirror angular extent α of cylindrical portion 114, which determines the proportion of directly emitted to reflected light. Preferably, the cylindrical portion 114 that wraps around the linear illumination source 74 is circular in shape, and the linear illumination source 74 lies at the centre of the circle.

The advantages of this feature are: increased light collection efficiency, approximately 50% reduction in the illuminator volume and the ability to improve illumination uniformity when illuminating surfaces tilted at high angles to the illuminator.

Figure 8C:
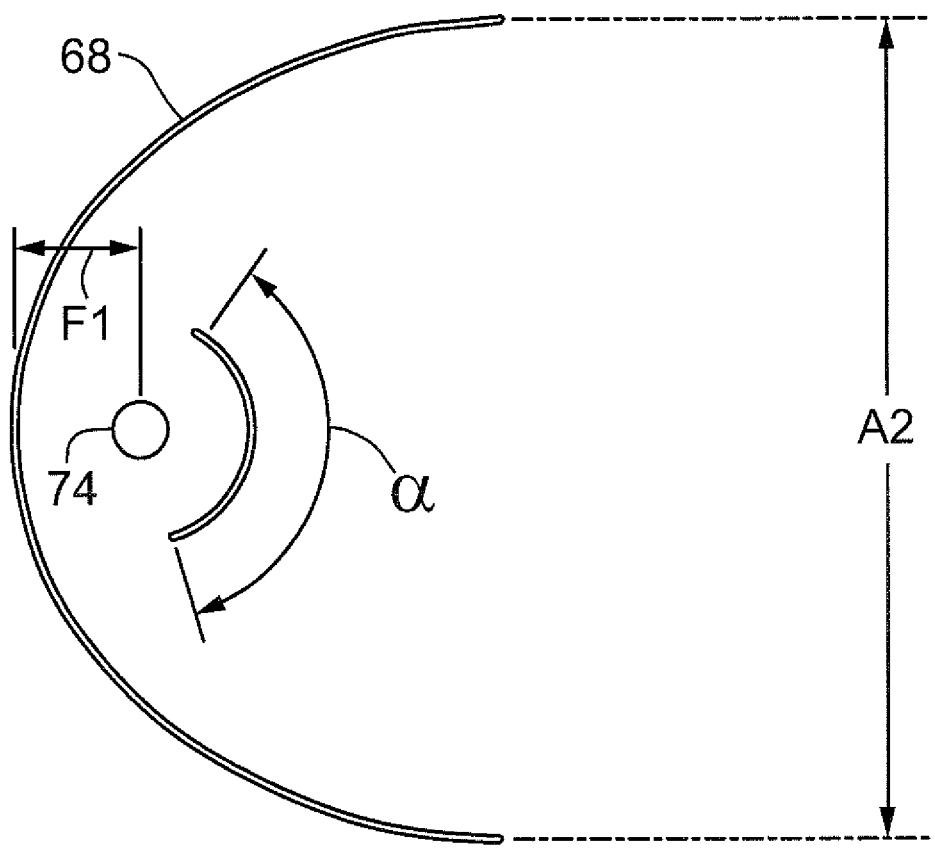
FIG. 8c is a side view of an alternative embodiment of a primary reflector of the dual reflector system including a mirror segment located parallel to the primary parabolic reflector to reflect stray light back through the mirror focus to improve the uniformity of the emitted beam.
Figure 8D:
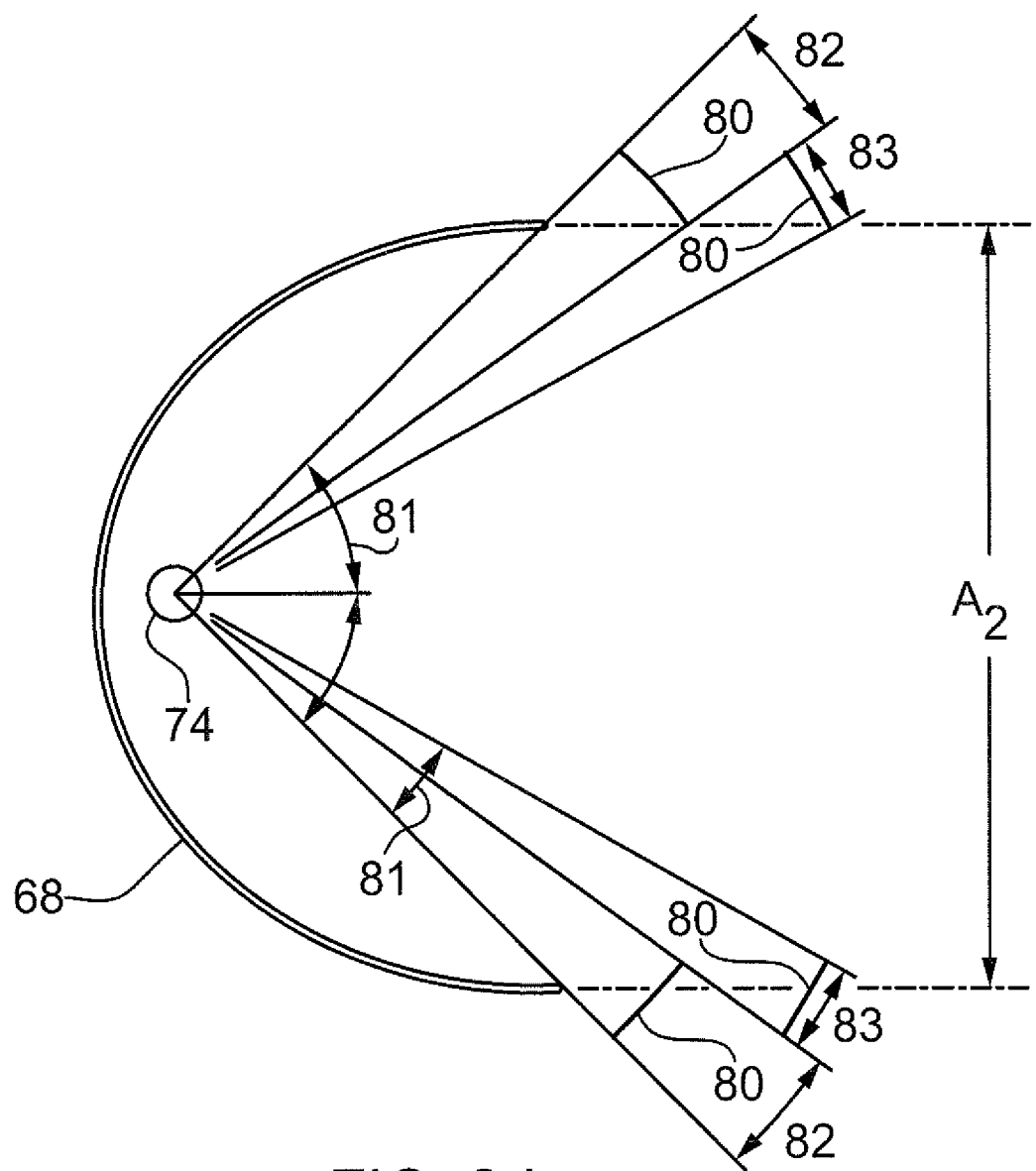
FIG. 8d is a side view of an alternative embodiment of a primary reflector of the dual reflector system including mirror segments located parallel to the primary parabolic reflector to reflect stray light back through the mirror focus to improve the light collection efficiency and the uniformity of the emitted beam. In the shown embodiment, the mirror segments are positioned such that they do not reflect any light which originally passed through the focal axis of and was reflected from the primary reflector.

The embodiment in FIGS. 8*c* and 8*d* show two other configurations which capture stray light not initially directed to the primary reflector 68; these include one or more mirror segments 80 located parallel to the primary reflector 68 which reflect stray light back through the mirror focal axis. As shown in FIG. 8*d*, the mirror segments 80 may be located such that they are not in the path of light which has passed through the primary focal axis and reflected from the primary reflector 68.

In principle neither the primary mirror 68 nor the secondary mirror 70 has to be strictly cylindrical. Particularly, the primary and secondary mirror vertices may be curved to increase the amount of light collected in the orthogonal plane. Adding curvature may be used to decrease the size of the mirrors e.g. the primary mirror could be curved so that the secondary mirror can be shorter and likewise by adding a curvature to the secondary mirror. Similarly, the primary mirror 68 does not need to be a pure parabolic cylinder if there is a cylindrical mirror replacing one half of the mirror. Thus, when referred to as being "generally cylindrical", as used herein this phrase covers pure cylindrical in addition to these other configurations.

It will readily be appreciated by one skilled in the art that the linear light source 74 may comprise many different sources of light. For example, the linear light source 74 may comprise a flash lamp, a continuous wave cylindrical linear light source, a tungsten halogen lamp, a sodium lamp, a metal halide lamp, and a fluorescent lamp. Further, the linear light source 74 may be a strobe light or provide continuous illumination.

Figure 13:
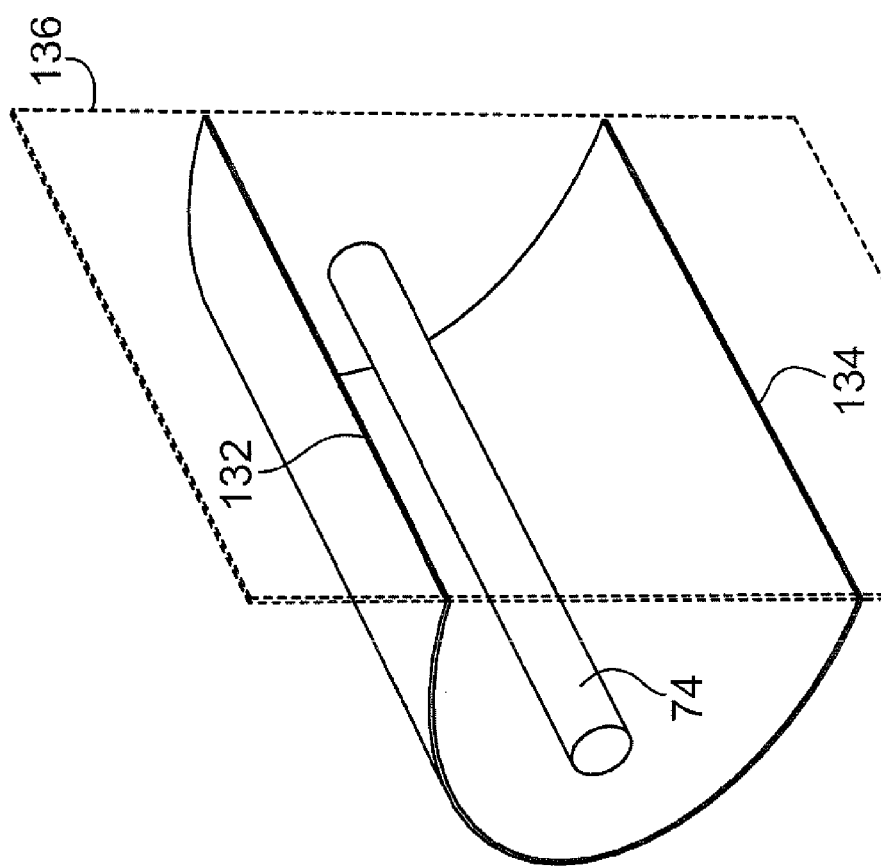
FIG. 13 is a perspective view showing the primary focal axis may be disposed between the primary generally cylindrical reflector and a plane defined by two straight edges on the primary generally cylindrical reflector.

In some embodiments of the invention, it is preferable that as much of the emitted light as possible is collimated by the primary and secondary generally cylindrical reflectors 68, 70. Therefore, the primary focal axis may be disposed between the primary generally cylindrical reflector 68 and a plane 136 defined by two straight edges 132, 134 on the primary generally cylindrical reflector 68, as shown in FIG. 13.

Further, adjustment of the beam emitted by the dual reflector system 60 is possible by providing the primary and secondary generally cylindrical reflectors 68, 70 in an adjustable configuration. To this end, the position and orientation of either one or both of the primary and secondary generally cylindrical reflectors 68, 70 may be adjustable. In some embodiments of the invention, for instance, the primary generally cylindrical reflector 68 may be able to translate and rotate on a plane perpendicular to the focal axis of the secondary generally cylindrical reflector 70. However the position of linear light source 74 preferably remains on the focal axis of the primary mirror 68 as the primary mirror 68 position and orientation are adjusted.

Primary Mirror Design

It is instructional to determine some of the basic design characteristics of a simple parabolic mirror. A simple geometric analysis can provide insight into what determines the average output beamwidth of the illuminator as a function of the parabola and linear light source characteristics. It should be noted that the analysis presented herein applies a simplified geometrical ray tracing and any design should include realistic models of the linear light source and mirror using more complex models and ray trace simulations.

Figure 9:
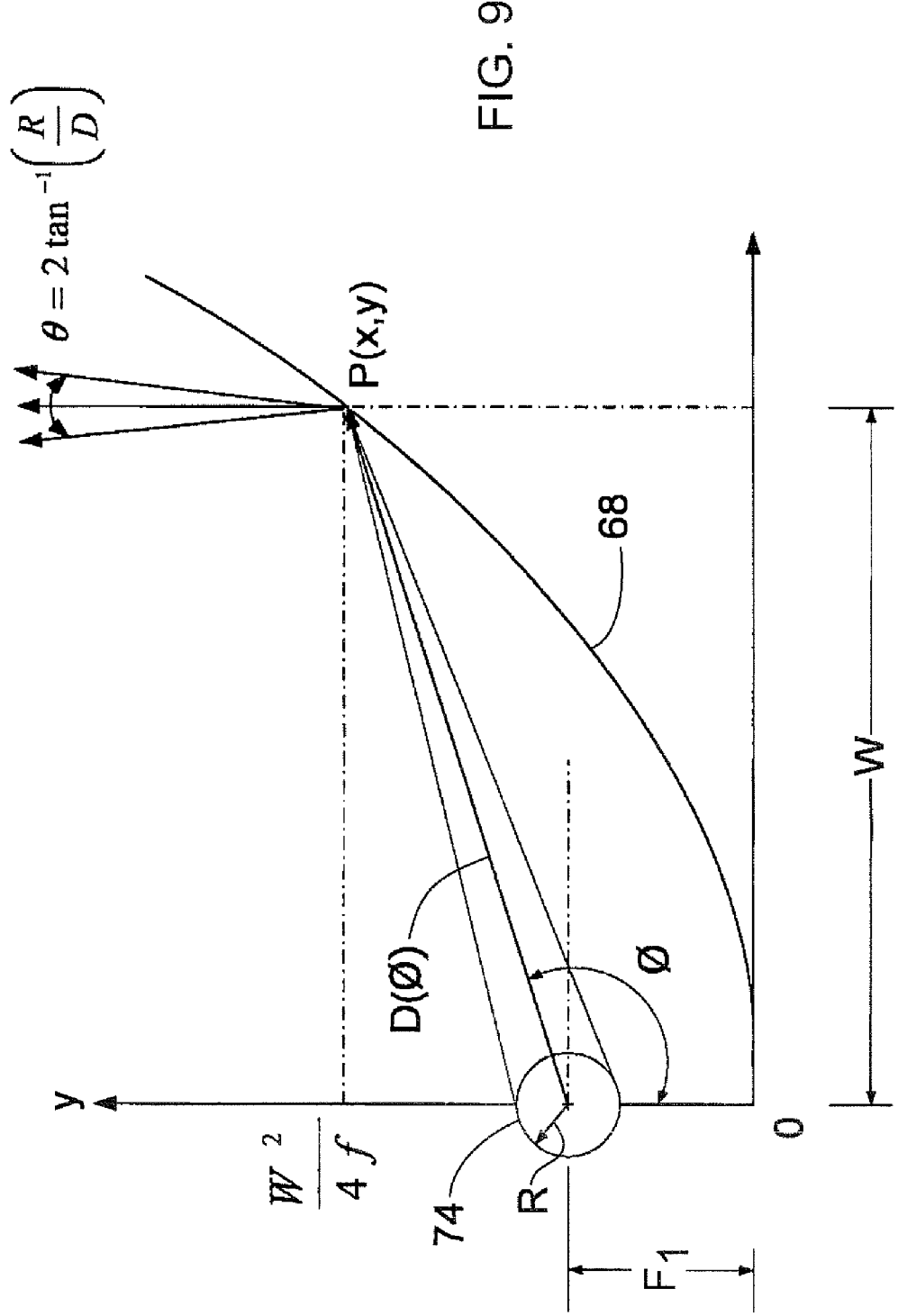
FIG. 9 shows a cross-section geometry of the primary parabolic mirror and the cross-section of the linear light source, forming part of the dual reflector system of the present invention, the figure only shows one-half of the parabolic mirror for simplicity.

FIG. 9 shows the cross-section geometry of the primary parabolic mirror 68 and the cross-section of the linear light source 74. The FIG. 9 only shows one-half of the parabolic mirror 68 for simplicity. The linear light source 74 has an internal radius R and is located at the focal point y=F1 of parabolic mirror 68. The other half is to the left of X=0. The linear light source 74 will always be at X=0, on the axis of the parabola defined by primary mirror 68. In the example of FIG. 9, the y axis location of the lamp is 0.5". In general, the y-axis location of the lamp 74 is y=Y. FIG. 9 shows, as a circle, the internal bore of the lamp, the area that generates light. The lamp has an internal bore diameter of 2R. The active length of the lamp arc is 1 inch (but is not restricted to this length), not shown in FIG. 9.

The equation for the parabola is given by $$y = \frac{x^2}{4f} \quad (1)$$

where f is the focal length of the parabola. For this analysis it is assumed that the light produced by the arc is emitted within the internal radius R.

It is a property of parabolic mirrors that a ray of light emanating from parabola focal point f and incident to the parabolic surface at an arbitrary point P(x,y), will reflect parallel to the optical axis of the parabola. The angle from this ray to the y axis is defined as φ. Since it is assumed that light is radially and uniformly emitted from the linear light source, then φ varies from zero degrees to a maximum angle $\phi_{max}$ determined by the half-aperture of the mirror W.

The distance form the focal point $F_1$ to a point P(x,y) as a function of angle φ is given by $$D(\phi) = \sqrt{x^2(\phi) + (f - y(\phi))^2} \quad (2)$$

where $$x(\phi) = 2f(\tan(\phi - 90) + \sqrt{\tan^2(\phi - 90) + 1}) \quad (3)$$

and $$y(\phi) = \frac{x^2(\phi)}{4f} \quad (4)$$

Other rays emitted from the interior of the lamp diverge from the parabola surface 68 with an angular beam width θ(φ) determined by the bore radius R and its distance, D(φ) from the point of reflection on the parabola surface where $$\theta(\phi) = 2\tan^{-1}\left(\frac{R}{D(\phi)}\right) \quad (5)$$

The maximum angle $\phi_{max}$ is determined when x is equal to the half aperture W so $$y(\phi_{max}) = \frac{W^2}{4f} \quad (6)$$

Therefore $$\theta(\phi_{max}) = 2\tan^{-1}\left(\frac{R}{D(\phi_{max})}\right) \quad (7)$$

where $$\phi_{max} = \frac{\pi}{2} + \tan^{-1}\left(\frac{W^2 - 4f^2}{4fW}\right) \text{ radians} \quad (8)$$

The average angular beam width, $\theta_{Average}$, is calculated by integrating over all the beam width angles values from φ=0 to $\phi_{max}$, then dividing by $\phi_{max}$.

$$\theta_{Average} = \frac{\int_0^{\phi_{max}} \theta(\varphi) d\varphi}{\phi_{max}} \quad (9)$$

The model assumes that the total amount of collected light is fixed so that if it is spread over a wider beam, then the peak intensity must decrease. In addition, the total amount of light collected by the mirror is proportional to the maximum subtended angle $\phi_{max}$ and the peak light intensity is inversely proportional to angular beam width. Therefore, a relative measure of peak intensity is the maximum subtended angle $\phi_{max}$ divided by the average angular beam width:

$$I_{peak} = \frac{\phi_{max}}{\theta_{Average}} \quad (10)$$

Table 1 illustrates the results of the ray trace analysis for the cases of two illuminators with linear light source bore radii of 0.08 and 0.12 inches, and a total aperture width of 5 inches. The focal length is varied from 0.5 to 2 inches. The maximum angle $\phi_{max}$ is shown as an indication of the amount of light collected by the parabolic reflector where amount collected is proportional to the value of $\phi_{max}$. The average angular beamwidth and the normalized peak intensity of the beam are also given. The central beam peak intensity is arbitrarily normalized to the smallest linear light source radius and focal length case for illustration.

TABLE 1

Example results of a simple 2D geometrical ray trace

| | | Linear light source Radius | | | |
|---|---|---|---|---|---|
| | Maximum | 0.08 inches | | 0.12 inches | |
| Focal Length (Inches) | angle $\phi_{max}$ (deg) W = 2.5 inches | Average Beam Width (deg) | Normalized Peak Intensity $I_{peak}$ | Average Beam Width (deg) | Normalized Peak Intensity $I_{peak}$ |
| 0.5 | 136.4 | 11.8 | 1 | 17.3 | 0.67 |
| 0.75 | 118 | 8.6 | 1.17 | 12.8 | 0.78 |
| 1 | 102.7 | 7.0 | 1.25 | 10.4 | 0.84 |
| 1.5 | 79.6 | 5.1 | 1.32 | 7.7 | 0.88 |
| 2 | 42.2 | 2.9 | 1.345 | 6.1 | 0.89 |

Several observations may be made in reference to Table 1 that may be used as design guidance. The smaller the focal length, the greater the magnitude of collected light. As the radius of the linear light source 74 decreases relative to the focal length, the linear light source 74 becomes more point-like and consequently, the output beam becomes more collimated and more intense. Conversely, as the linear light source R radius becomes large compared to the focal length, the output beam widens and is less intense. Increasing the focal length decreases the total light but also decreases beam width more quickly.

Secondary Mirror Design

Figure 10:
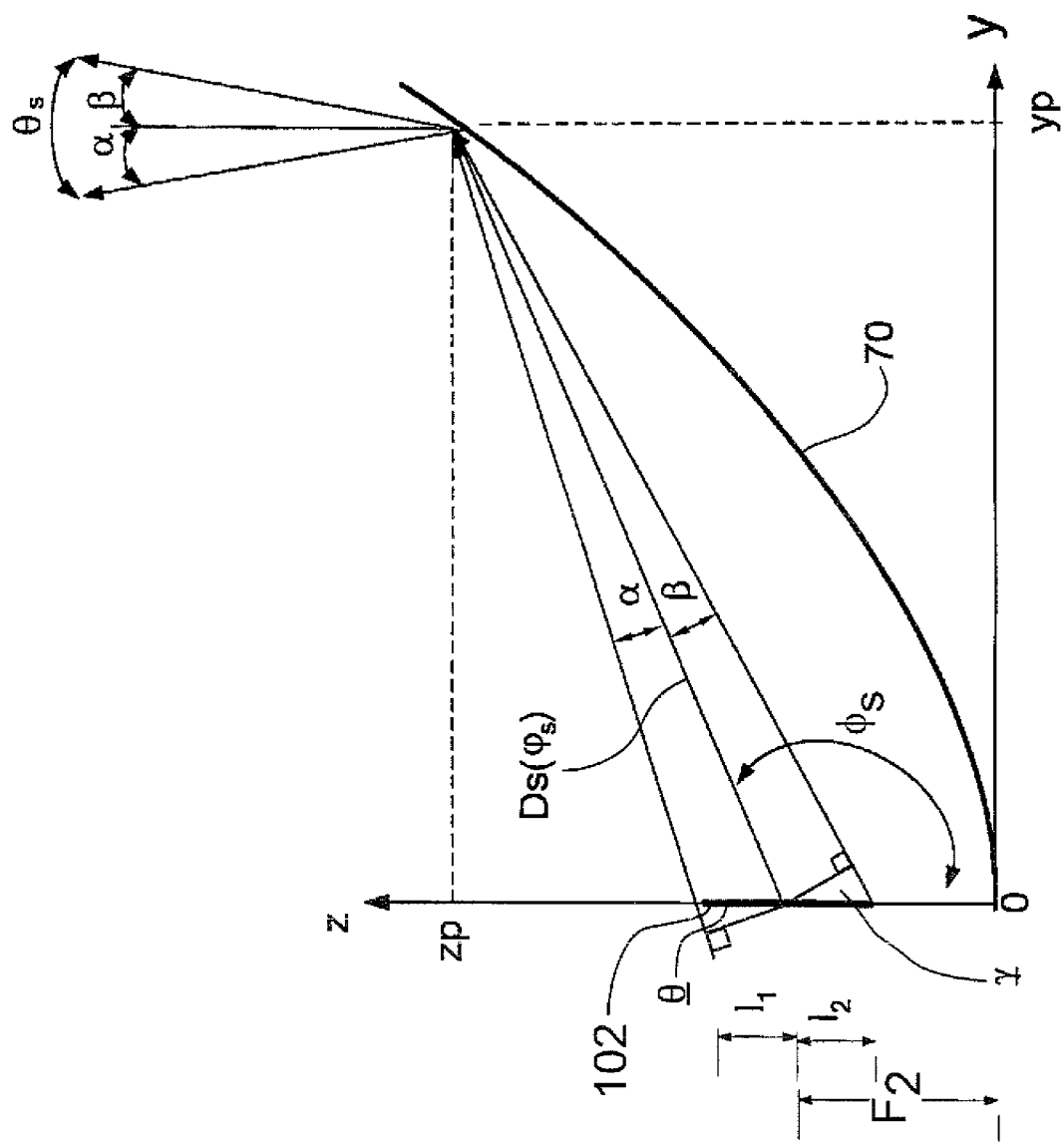
FIG. 10 is a drawing showing the geometry of the secondary mirror and linear light source location forming part of the dual reflector system of the present invention.

FIG. 10 shows a plan view diagram of the illuminator with the primary mirror 68 and linear light source 74 located at the primary mirror 68 focal point $F_1$. The secondary mirror 70 is positioned such that its focal plane is parallel to the primary mirror axis and a distance S from the primary mirror 68 focal point $F_1$. The diagram is similar to FIG. 9 except that the light source is a linear source rather than an isotropic cylindrical source. The secondary mirror 70 collects direct light from along the length of the linear light source 74 and the light reflected from the primary mirror 68, and reflects it towards the illuminated surface.

The analysis of the combined primary mirror 68 and secondary mirror 70 is complex but may be qualitatively understood by simplifying the geometries. Replacing the primary mirror 68 and linear light source 74 with a single linear source centered at the primary mirror 68 focal point f permits a simplified analysis similar to that done with the primary mirror 68.

Referring to FIG. 10, the geometry of the secondary mirror 70 and linear light source location are shown, in which the rays emitted from the ends of the linear light source 102 and incident at point P(yp, zp) on the parabolic mirror 70 with focal length $f_s$. The equation for the parabola is given by $$z = \frac{y^2}{4f_s} \quad (11)$$

where $f_s$ is the focal length of the parabola. As before, the distance form the focal point $f_s$ to a point P(y,z) as a function of angle $\phi_s$ is given by $$D_s(\phi_s) = \sqrt{y^2(\phi_s) + (f_s - z(\phi_s))^2} \quad (12)$$

where $$z(\phi_s) = 2f_s\left(\tan(\phi_s - 90) + \sqrt{\tan^2(\phi_s - 90) + 1}\right)$$

and $$z(\phi_s) = \frac{y^2(\phi_s)}{4f_s}$$

Other rays emitted from the interior of the lamp diverge from the parabola surface of primary mirror 68 with an angular beam width $\theta_s(\phi_s)$ determined by the source length l and its distance, $D_s(\phi_s)$ from the point of reflection on the parabola surface where from the geometry, $$\theta = \phi_s - 90 - \alpha$$

and $$\gamma = \phi_s - 90 + \beta$$

and it can be shown that $$\alpha(\phi_s) = \tan^{-1}\left(\frac{l_1 \cos(\phi_s - 90)}{D_s(\phi_s) - l_1 \sin(\phi_s - 90)}\right)$$

and $$\beta(\phi_s) = \tan^{-1}\left(\frac{l_2 \cos(\phi_s - 90)}{D_s(\phi_s) + l_2 \sin(\phi_s - 90)}\right)$$

Therefore $$\theta_s = \alpha(\phi_s) + \beta(\phi_s)$$

so the angular beamwidth is $$\theta_s(\phi_s) = \tan^{-1}\left(\frac{l_1 \cos(\phi_s - 90)}{D_s(\phi_s) - l_1 \sin(\phi_s - 90)}\right) + \tan^{-1}\left(\frac{l_2 \cos(\phi_s - 90)}{D_s(\phi_s) + l_2 \sin(\phi_s - 90)}\right)$$

The maximum angle $\phi_{max}$ is determined when x is equal to the half aperture $W_s$ so $$z(\phi_{max}) = \frac{W_s^2}{4f_s}.$$

As before $$\phi_{smax} = 90 + \tan^{-1}\left(\frac{W_s^2 - 4f_s^2}{fW_s}\right)$$

and given the light distribution from a linear light source is given by the approximate function $$I(\phi) = \frac{2\cos(\phi - 90)}{1 + \cos(\phi - 90)^2}$$

this can be combined with the geometrical beamwidth to provide a weighted beamwidth that is more physically representative. Therefore the weighted average angular beam width, $\bar{\theta}_S$ is given by.

$$\bar{\theta}_s = \frac{\int_0^{\phi_{smax}} \theta s(\varphi) \frac{2\cos(\varphi - 90)}{1 + \cos(\varphi - 90)^2} d\varphi}{\phi_{smax}}.$$

These formulas can be used to perform a first-order design of the reflector based upon the linear light source emission length, desired average horizontal beamwidth and the reflector size constraints.

This analysis ignores the primary mirror 68 and linear light source 74 and assumes the light source is located at the secondary focal plane and the initial inclination is to have the primary mirror 68 and secondary mirror 70 focal planes coincide. However, this is a sub-optimal design from the standpoint of light collection efficiency and beam quality. Instead, in some embodiments of the invention, the secondary focal axis is located behind the vertex 122 of the primary mirror at a distance equal to the focal length of the primary mirror 68, $F_1$. Doing so can increase the average intensity of the beam by more than 25%.

Figure 11:
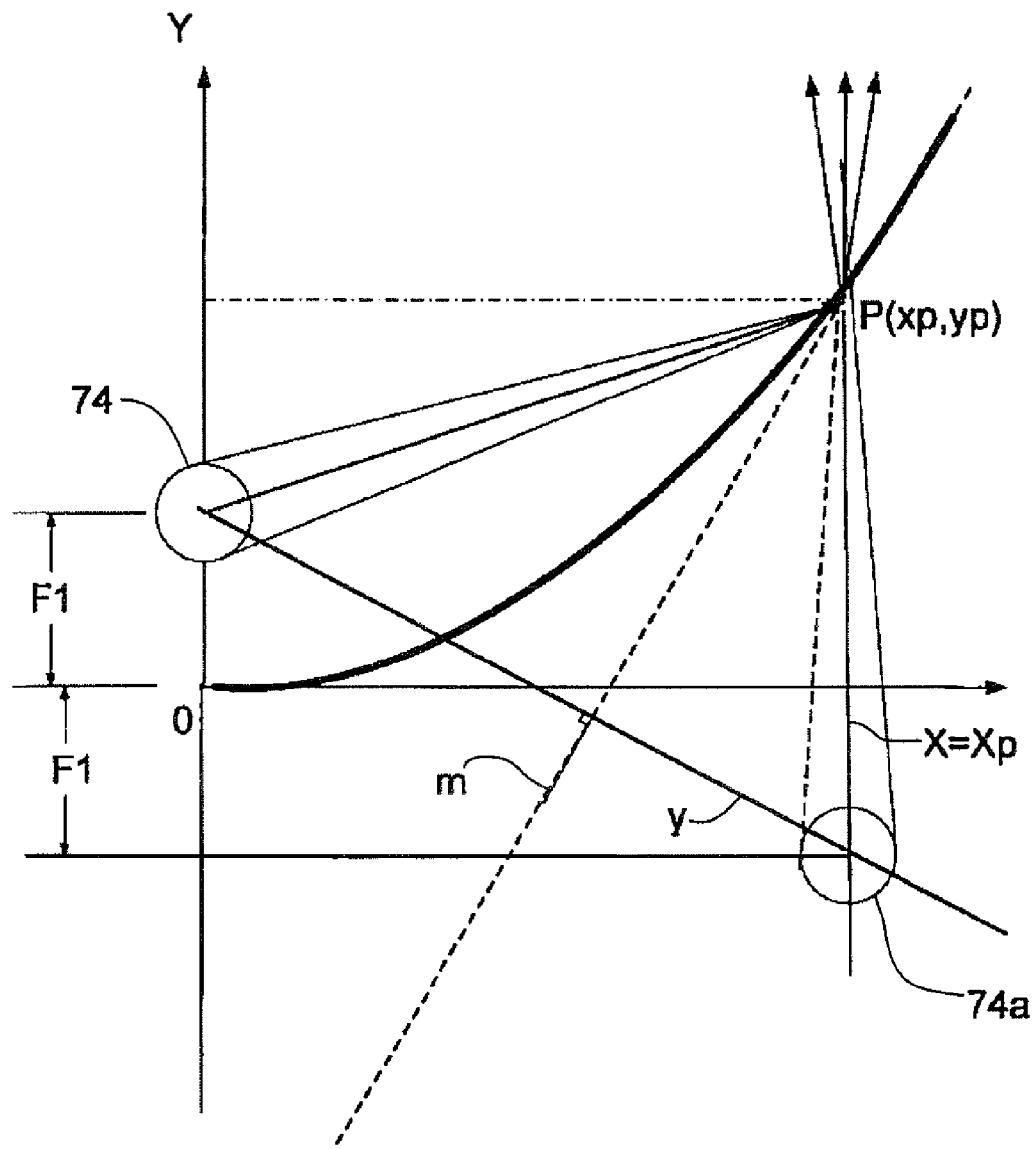
FIG. 11 is a drawing showing the geometry of the linear light source of FIG. 9 and its reflected virtual source.

The reason for placing the secondary mirror 70 focus behind the primary mirror 68 can be seen by considering the reflection of the light from the linear light source 74 in the primary mirror 68. FIG. 11 shows a drawing of the geometry of the linear light source and its reflected virtual source 74a. Referring to FIG. 11, light rays from the lamp 74 are incident at a point in the mirror P(x,y). The incident rays are reflected and diverge away from the mirror 74 as disused in previous sections. The divergent rays may be considered to emanate from a virtual source 74a which is a reflection of the original lamp perpendicular to the plane of the mirror surface tangent. The location of the virtual source 74a varies along the parabola. The locus of the virtual sources 74a can be determined by calculating the intersection of the line between the source 74a and its reflection y and the line X=Xp.

The line y is perpendicular to the parabola's tangent which has a slope m and the general equation for y is given by $$y = \frac{-1}{m}x + f$$

The slope of the parabola $$y = \frac{x^2}{4f}$$

is given by $$m(x) = \frac{dy}{dx} = \frac{x}{2f}.$$

Substituting the slope into the equation for y and setting X=Xp produces
 $y=-f.$ Consequently the locus of all the virtual sources lies on a line located behind the parabola vertex at a distance equal to the parabola focal length. This simplified analysis suggests that, to collect and focus as much light as possible from the real and virtual light sources 74 and 74*a* respectively, the focal plane $F_2$ of the secondary mirror 70 is preferably located at or behind the primary mirror vertex 122, and more preferably is located at a distance equal to the primary mirror 68 focal length $F_1$ behind the primary mirror 68 vertex.

To quantify the degree of improvement, a dual reflector system was simulated using a commercially available ray tracing analysis program. The secondary mirror 70 position was varied and the total normalized average light intensity within the beam spot was calculated. The results are shown in FIG. 12 which shows normalized average intensity as a function of secondary mirror focal plane position.

Figure 12:
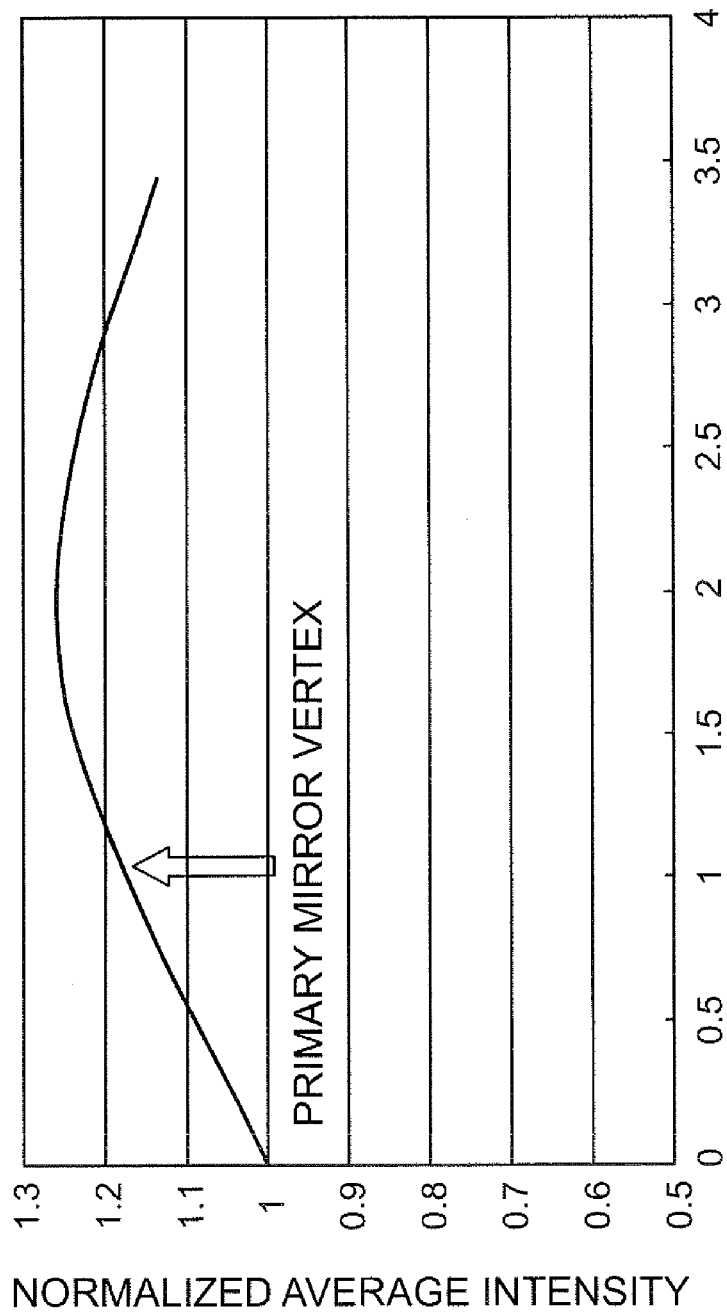
FIG. 12 shows a plot of normalized average Intensity as a function of secondary mirror focal plane position.

The results shown in FIG. 12 indicate that the optimum amount of focused light occurs when the secondary mirror focal plane is located behind the primary mirror 68 vertex at a distance equal to the primary focal length $F_1$. The optimum location increases the average amount of focused light by over 25% compared to the primary focal point location. Increasing the distance from the vertex 122 further causes the output beam to defocus and the amount of light decreases.

The dual reflector system disclosed herein improves light collection efficiency and enables controlling of illumination beam size to best suit the application where illumination is needed. It improves the light uniformity of linear light sources such as linear arc lamps and strobed light. The system is more efficient than existing strobe flashlamp illuminators, is compact, all reflective (no colour), lightweight, simple and inexpensive to manufacture. These features result in increased illumination range, lower power requirements and better quality images from cameras that use this illuminator. The system has applications to machine vision, surveillance, spectroscopic inspection of materials, and converting linear light sources, such as tungsten halogen lamps, sodium lamps, metal halide lamps or fluorescent tubes, into rectangular beam spot lights (stage lights, projectors, vehicle headlights).

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An illuminator system, comprising:
   a dual reflector system comprising
      a primary generally cylindrical reflector having a primary focal axis and oriented to collimate light in a first plane, and
      a secondary generally cylindrical reflector having a secondary focal axis and oriented to collimate light in a second plane, said primary generally cylindrical reflector and said secondary generally cylindrical reflector being mounted on a support structure such that said primary generally cylindrical reflector and said secondary generally cylindrical reflector are generally orthogonal to each other; and
      a linear light source having an emission length disposed on the primary focal axis; wherein
   said primary generally cylindrical reflector and the secondary generally cylindrical reflector are oriented relative to each other on said support structure so that light emitted by the linear light source is reflected and becomes collimated in both said first plane and said second plane.

2. The illuminator system according to claim 1 wherein said primary generally cylindrical reflector is a primary generally cylindrical parabolic reflector having a primary vertex and a primary focal length between the primary vertex and said primary focal axis; and
   said secondary generally cylindrical reflector is a secondary generally cylindrical parabolic reflector having a secondary vertex and a secondary focal length between the secondary vertex and said secondary focal axis.

3. The illuminator system according to claim 2 wherein the secondary focal axis is located on or behind the primary vertex.

4. The illuminator system according to claim 3 wherein said secondary focal axis is behind said primary vertex at a distance equal to said primary focal length from said primary vertex.

5. The illuminator system according to claim 2 wherein said secondary focal length is greater than or equal to half of the emission length of said linear light source.

6. The illuminator system according to claim 2 wherein one of said primary vertex, said secondary vertex, and said primary and secondary vertices are curved.

7. The illuminator system according to claim 2 wherein one of said primary vertex, said secondary vertex, and said primary and secondary vertices are linear.

8. The illuminator system according to claim 1 wherein said linear light source is one of a flash lamp, a continuous wave cylindrical linear light source, a tungsten halogen lamp, a sodium lamp, a metal halide lamp, and a fluorescent lamp.

9. The illuminator system according to claim 8 wherein said linear light source is a strobe light.

10. The illuminator system according to claim 1 wherein said dual reflector system further includes at least one mirror segment located parallel to said primary generally cylindrical reflector and oriented with respect to said primary generally cylindrical reflector to reflect stray light back through said primary focal axis.

11. The illuminator system according to claim 10 wherein said at least one mirror segment is positioned such that light passing through said primary focal axis and reflecting from said primary generally cylindrical reflector does not reflect from said at least one mirror segment.

12. The illuminator system according to claim 1 wherein one or both of said primary generally cylindrical reflector and said secondary generally cylindrical reflector comprise at least one flexible reflective sheet mounted to inserts.

13. The illuminator system according to claim 12 wherein said inserts are mounted to a single base.

14. The illuminator system according to claim 12 wherein said inserts form the flexible reflective sheet into the shape of a parabola.

15. The illuminator system according to claim 1 wherein one or both of said primary generally cylindrical reflector and said secondary generally cylindrical reflector are milled from reflective material.

16. The illuminator system according to claim 15 wherein said milled reflective material is mounted to a single base.

17. The illuminator system according to claim 15 wherein a surface of said milled reflective material is in the shape of a parabola.

18. The illuminator system according to claim 1 wherein said first and second planes are mutually orthogonal.

19. The illuminator system according to claim 1 wherein said primary generally cylindrical reflector and said secondary generally cylindrical reflector are positioned and oriented relative to each other on said support structure in an adjustable manner.

20. The illuminator system according to claim 19 wherein said linear light source has a longitudinal axis along said emission length, and wherein said linear light source is fixed with respect to the primary generally cylindrical reflector with its longitudinal axis aligned along the focal axis of the primary generally cylindrical reflector.

21. The illuminator system according to claim 19 wherein said primary generally cylindrical reflector is able to translate and rotate relative to said secondary generally cylindrical reflector in a plane perpendicular to said secondary focal axis.

22. The illuminator system according to claim 1 wherein said primary generally cylindrical reflector has two straight edges, and said primary focal axis lies between said primary generally cylindrical reflector and a plane defined by the two straight edges.

23. The illuminator system according to claim 1 wherein a portion of said primary generally cylindrical reflector is parabolic and a remaining portion of said primary generally cylindrical reflector wraps around the linear light source.

24. The illuminator system according to claim 23 wherein said portion of said primary generally cylindrical reflector that wraps around the linear light source is in the shape of a circle, and wherein said linear light source is disposed at a center of said circle.

* * * * *